Jan. 30, 1934.  R. S. DEANS  1,944,969
GAS HOLDER VALVE
Filed May 15, 1929  3 Sheets-Sheet 1
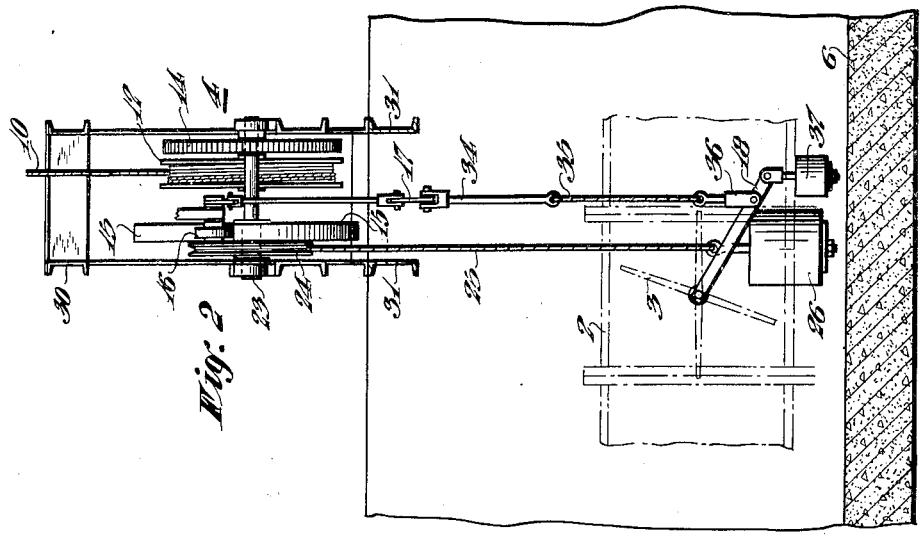
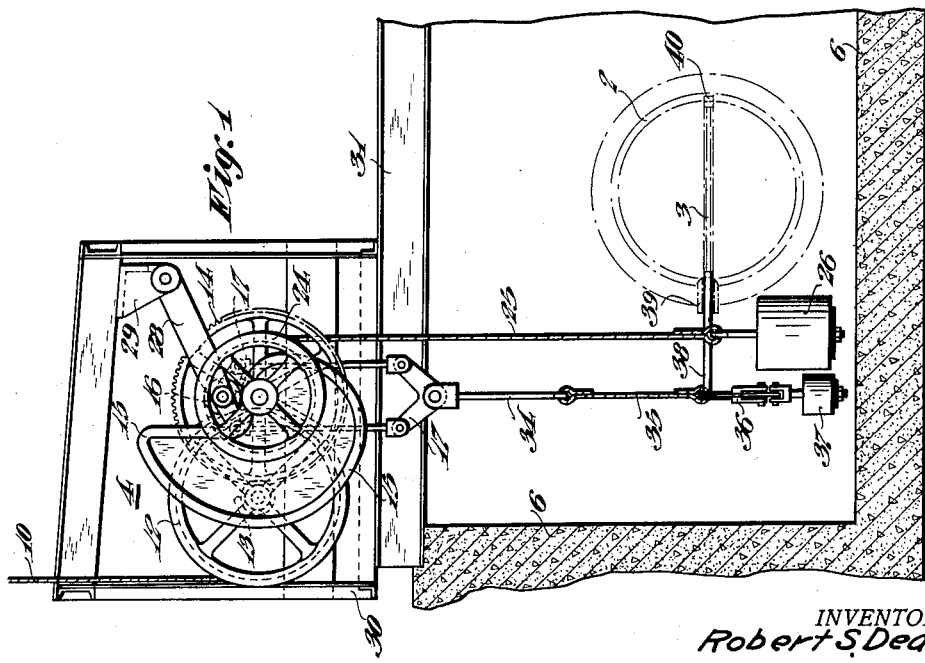
INVENTOR.
Robert S. Deans.
BY Jesse R. Langley
ATTORNEY.

Jan. 30, 1934.  R. S. DEANS  1,944,969
GAS HOLDER VALVE
Filed May 15, 1929   3 Sheets-Sheet 2

INVENTOR.
Robert S. Deans
BY Jesse R. Langley
ATTORNEY.

Jan. 30, 1934.            R. S. DEANS            1,944,969
                         GAS HOLDER VALVE
                      Filed May 15, 1929        3 Sheets-Sheet 3
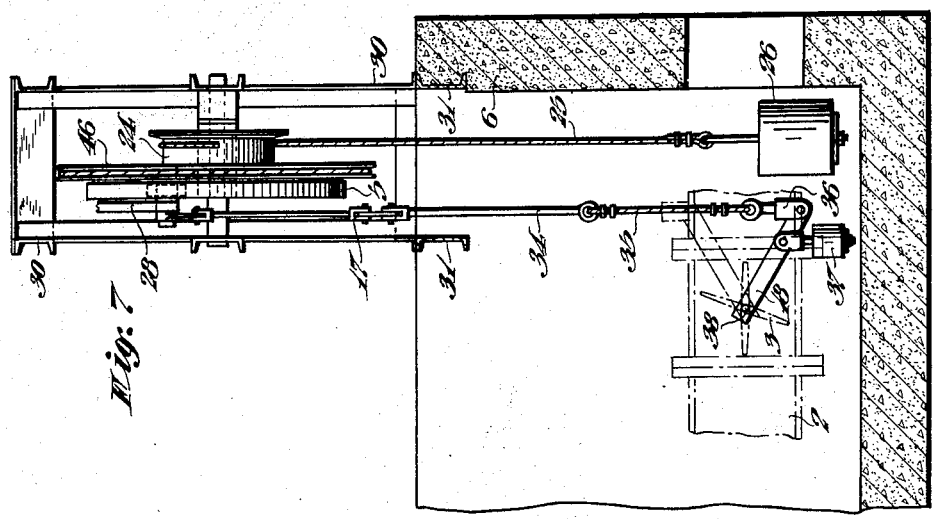
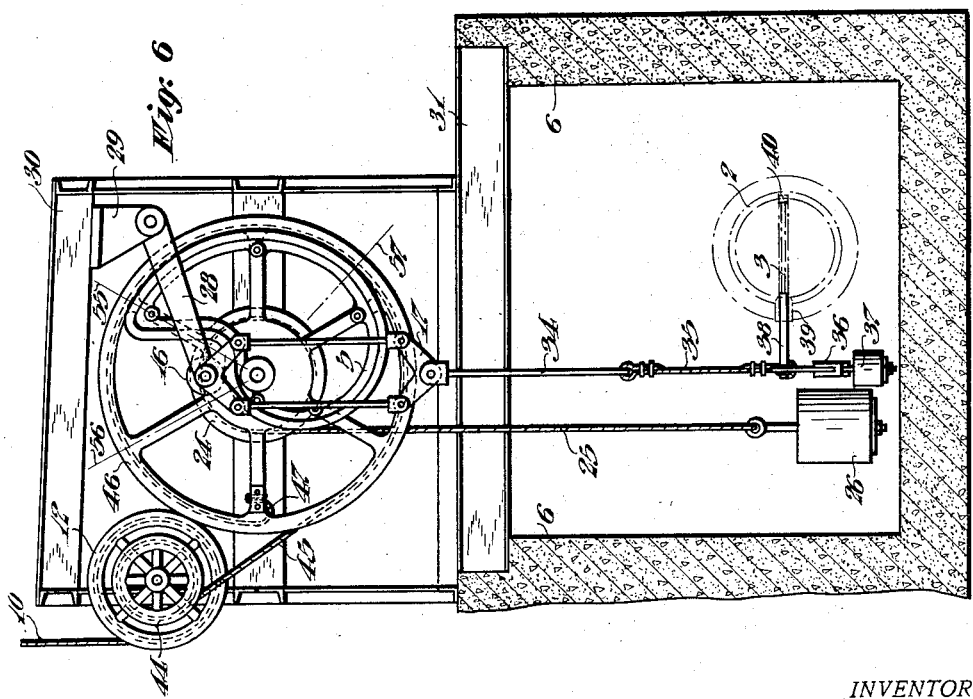
INVENTOR.
Robert S. Deans.
BY Jesse R. Langley
ATTORNEY.

Patented Jan. 30, 1934

1,944,969

UNITED STATES PATENT OFFICE 1,944,969

GAS HOLDER VALVE

Robert S. Deans, Swissvale, Pa., assignor to The Koppers Company of Delaware, a corporation of Delaware Application May 15, 1929. Serial No. 363,149

11 Claims. (Cl. 48—176)

This invention relates to improvements in automatic operating mechanism for valves located on gas mains connected to gas holders of the storage type. More particularly, it comprises improvements in mechanism having as a source of power the movements of the bell or piston of the gas holder itself, the mechanism in turn actuating valves to control the flow of gas through the mains in accordance with requirements dependent on the amount of gas in the holder.

A typical application of such mechanism is that for closing the valve in the main that conducts gas to the holder as the movable portion or bell of the gas holder rises to the upper part of its travel due to the quantity of gas therein approaching the capacity limit of the holder.

The mechanism should not transmit motion from the bell of the gas holder to the gas main valve during every part of the upward and downward travel of the bell since at certain parts of its travel the valve should be left stationary in an open or closed position and at certain other parts of the bell's travel the valve should be subjected to movement for opening or closing the same.

As previously constructed, certain of these valve-controlling mechanisms have comprised a complicated system of weights and pulleys that occupied considerable space, were cumbersome and were subject to operating difficulties.

Due to the complexity of the above construction and its excessive number of weights, pulleys and other parts it has required a cumbersome supporting framework, since it did not lend itself to any adaptation that would result in a compact assemblage.

The improvement in the mechanism of my invention consists in part in replacing the unwieldy units of complicated parts with a simple positively acting arrangement of few parts that is small and compact and in other changes as will appear from a reading of the detailed description in connection with the accompanying drawings.

Figure 1 is a side elevation of the mechanism operatively connected to a valve;

Fig. 2 is an end elevation of the mechanism shown in Fig. 1;

Fig. 6 is a side elevation of the mechanism of Fig. 5 and is shown operatively connected to a valve; and Fig. 7 is an end elevation of the mechanism shown in Figs. 5 and 6.

Referring to Figs. 1 to 4 of the drawings, a gas holder 1 is supplied with gas through a main 2 having a valve 3 that is controlled by a mechanism 4.

Figure 4:
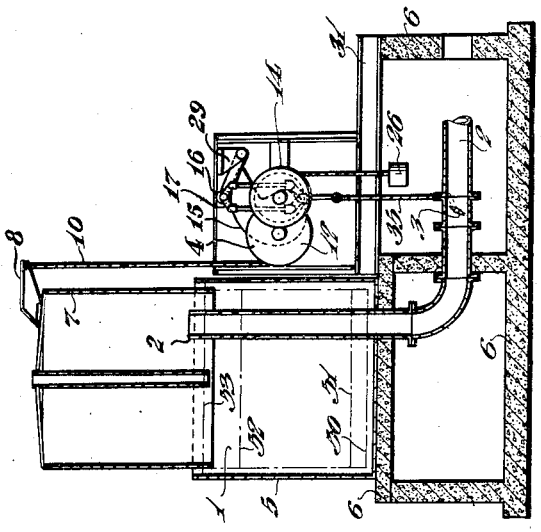
Fig. 4 is a vertical cross-section through a gas holder, showing the mechanism of Figs. 1, 2 and 3 attached thereto.

As shown in Fig. 4, the gas holder 1 comprises a stationary tank portion 5 that rests upon a foundation 6. The holder comprises also an upper movable portion or bell 7 having a bracket 8 that is connected by a rope 10 to the valve opening mechanism 4.

The vertically extending rope 10, upon upward movement, is capable of rotating a drum 12 by unwinding therefrom. As shown in Figs. 1 to 4, inclusive, the drum 12 rotates a pinion 13 that engages a large spur gear wheel 14 that in turn rotates a cam 15.

A roller 16 rests on the surface of cam 15 and is mounted in an elongated yoke 17 that pulls upwardly on the end of a lever 18 for the purpose of rotating the butterfly valve 3 located in the gas main 2.

The drum 12 and the pinion 13 are each keyed to a short shaft 21, the inner end of the shaft 21 being supported by a bearing 22. The large toothed gear 14 is keyed to a shaft 23 shown in Figs. 2 and 3 to which is also keyed the cam 15.

A grooved pulley 24 is also mounted on the shaft 23 having a rope 25 wound thereon that supports a weight 26 which is necessary for the purpose of keeping the rope 10 taut. The weight 26 also furnishes the power for operating the mechanism during the descent of the bell 7 when rope 10 is being wound upon drum 12.

Figure 3:
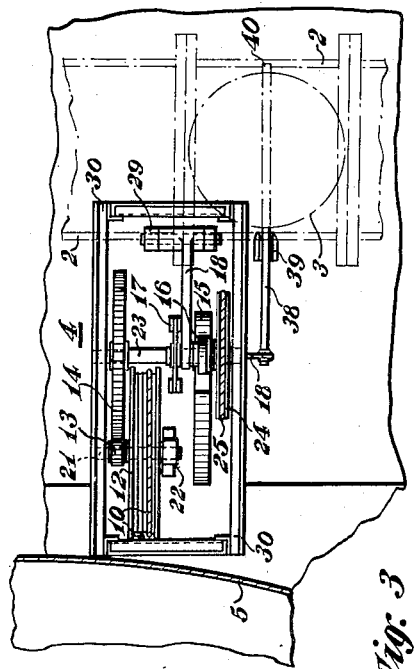
Fig. 3 is a plan view of the mechanism shown in Figs. 1 and 2.

The roller 16 is mounted at one side of the extreme end of a lever 28 shown in Figs. 1 and 3. The other side of the same end of the lever 28 supports the upper end of the elongated yoke 17. The opposite end of the lever 28 is supported by a bracket 29 which is strong enough to prevent any twisting of the lever 28 and thus maintain the upper end of the yoke 17 on a level with roller 16.

The bracket 29 is attached to a large frame 30 which encloses the entire mechanism, indirectly supports the bearing 22 and directly supports all the other bearings. The main frame 30 rests on steel beams 31 that are located at the top of the foundation 6 which encloses the valve 3 and the gas main 2.

The yoke 17 is connected to the end of lever 18 by means of a rod 34, a short cable 35 and a clip 36. The end of lever 18 has a weight 37 attached which keeps the cable 35 taut and maintains the roller 16 in contact with cam 15.

The lever 18 is keyed to the end of a shaft 38 that passes through a stuffing gland 39 to the interior of the gas main 2 where it supports a butterfly valve 3 with the aid of a bearing 40 located opposite the stuffing gland 39.

Figure 5:
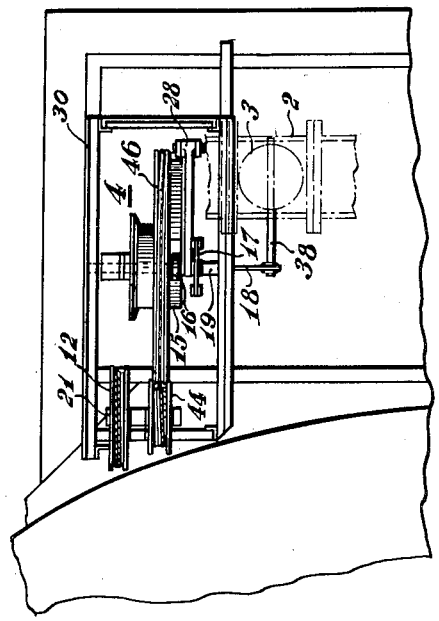
Fig. 5 is a plan view of a modification of the mechanism shown in Figs. 1 to 4, inclusive.

A modification shown in Figs. 5, 6 and 7 has elements that duplicate those of the embodiment shown in Figs. 1 to 4, inclusive, with the exception of pinion 13 and gear wheel 14. Instead of the pinion 13, a small winding drum 44 that rotates with drum 12 is provided. This small drum transmits motion by means of a rope or cable 45 to a large grooved pulley 46 that is substituted for the toothed gear 14 of the other embodiment. The fastening means for one end of the cable 45 is shown at 47.

On Fig. 4 is shown four horizontal dot-and-dash lines 50 to 53, inclusive, that show successive positions of the lower end of the bell or movable part 7 as it is filled with gas. Starting with the gas-holder empty so that the position of the lower end of the bell is represented by line 50 and assuming the holder to be receiving gas from a main 2, the cam 15 is so shaped that it has no effect on the valve while the bell 7 of the holder is moved from position 50 to position 51.

When the holder is at 50, 51 or any intermediate position, the butterfly valve 3 is horizontal so as to leave the main entirely open for the entry of gas into the holder. Such a position of the valve 3 is brought about by having the roller 16 rest on a low part of the cam, as is shown in Figs. 1 and 6.

While the lower end of the holder 7 moves from position 51 to 52, a gradually rising or expanding part of the cam passes beneath the roller 16 so that the valve 3 closes and is entirely closed by the time the lower end of the holder 7 reaches the position 52.

Should leakage of gas past the valve 3, and such valves are not gas tight, cause a still further rise of the holder 7 from position 52 to the position represented by the line 53, breakage of the mechanism actuating the valve is prevented since a circular portion of the cam passes beneath the roller 16 whereby further rise of the yoke 17 does not occur.

The valve 3 may have sufficient clearance with respect to the interior of the main 2 to permit the turning of the valve past a position at right angles to the axis of the main without binding or breakage. If it has such clearance, the circular portion of the cam is still essential as it obviates the reopening of valve.

Fig. 6 shows the portion of the cam that produces no rise of the yoke 17 while passing under the roller 16 and corresponds to the movement of the holder from position 50 to position 51 as included in the angle between the lines 55 and 56. This part of the cam is circular in shape and is of very small radius.

The portion of the cam which acts while the holder is moving from position 51 to position 52 is shown in Fig. 6 as located in the angle between the lines 56 and 57 and is more than 180° in extent. This portion is of constantly increasing radius as it passes under roller 16 and lifts yoke 17, due to upward motion of the gas holder bell.

The portion of the cam located in the angle between lines 57 and 55 of Fig. 6 is circular, produces no further lifting action on the yoke 17 and passes beneath the roller 16 while the gas-holder bell 7 is rising from position 52 to position 53. Fig. 4 shows this portion of the cam underneath the roller 16 with the valve 3 entirely closed. The movement of the holder 7 to a position higher than that indicated by line 52 as shown in Fig. 4 is due to leakage of gas past the valve 3.

This leakage, incidentally, permits the bell 7 to descend to and below position 52 when pressure falls in the gas main 2 so as to withdraw gas from the holder 7. Otherwise, the apparatus would remain locked in position after the bell 7 rises above the position 52, providing there were no outlet other than gas main 2 for the holder.

In operation, the rise of the bell 7 pulls upwardly on rope 10, which rotates drum 12 by unwinding therefrom and slowly turns the cam 15 by means of either the tooth gearing or the winding drum reduction gear. As the bell 7 rises, the increasing radius of the cam slowly closes the valve 3, thereby preventing the passage of any but a small amount of gas after the tank is filled to capacity.

The lowest and the highest parts of the cam are each formed of curves that are true circles so as to provide an idle period before the valve 3 commences to close and an idle period for preventing breakage after the valve 3 is fully closed.

When the gas-holder 7 descends, the above cycle of events is repeated in inverse order, the source of power during the descent of the holder 7 being the weight 26 aided somewhat by the weight 37.

In either the embodiment first illustrated or the modification thereof, there are only two main rotating shafts and the number of accessory parts are correspondingly reduced. Moreover, all or nearly all of the cable that is not extended up the side of the tank in a straight line is neatly wound on a drum.

It is apparent therefore, that the amount of necessary supporting framework is reduced to a minimum, that the elements comprising the mechanism are not spread through a wide space so as to invite an undue amount of depreciation from the effects of the weather and since the parts are compact there is less chance for misalignment and other mechanical derangements.

Also, the transmission of motion to the valve at certain portions only of the vertical movement of the gas holder bell and the maintaining of the valve in certain positions at other portions of the movement of the gas-holder bell are definite and positive. There is no danger of the valve being moved when it should be stationary or of its being stationary at a period when it should be undergoing an opening or closing movement.

I claim as my invention:

1. In automatic mechanism for controlling a gas holder valve, a holder for storing gas and having a movable member, a cable attached to said movable member, a winding drum for the cable, a cam, reduction gearing between the winding drum and the cam and means for connecting the cam and the valve.

2. In automatic mechanism for controlling a gas holder valve, a holder having a movable member, a cable attached to said movable member, a winding drum for the cable, a cam, toothed reduction gearing between the winding drum and the cam and means for connecting the cam and the valve 3. In automatic mechanism for controlling a gas holder valve, a holder having a movable member, a cable attached to said movable member, a winding drum for the cable, a cam, a pulley for turning the cam, a hub attached to the winding drum, a rope connecting the hub to the pulley and means for connecting the cam to the valve.

4. In automatic mechanism for operating a gas holder valve, a holder having a movable member, a cable attached to said movable member, a winding drum for the cable, a cam, a pulley for turning the cam, a hub attached to the winding drum, a rope connecting the hub to the pulley, means for connection from the cam to the valve, and weight means for keeping the rope and cable taut.

5. In automatic mechanism for controlling a gas holder valve, a holder having a movable member, a cable attached to said movable member, a drum operated by unwinding of the cable therefrom, a cam, reduction gearing for connecting said cam and said drum, means comprising an element coacting with the cam for actuating the valve, a pulley connected to the cam and a weight suspended from the pulley for opening the valve upon descent of said movable member.

6. In apparatus for operating a gas holder valve by means of movement of a part of the gas holder, a cam, a shaft supporting the cam, an element engaging the surface of the cam and means comprising a yoke for transmitting motion from the element to the valve.

7. Apparatus for operating a gas holder valve by means of movement of a part of the gas holder comprising a cam, an element engaging the surface of the cam, an arm for supporting the element, a yoke attached to the arm and connected to the valve, said arm permitting the yoke to be off-set with respect to the cam.

8. Apparatus comprising a gas storage holder having a movable member, a gas main connected to said movable member, a valve in the gas main and mechanism for utilizing movement of said member for actuating the valve and comprising a cam with a portion that maintains the valve open while said member is within the lower part of its travel, a portion that closes the valve as the holder rises through the intermediate part of its travel and a portion that maintains the valve closed while said member is within the upper part of its travel.

9. Apparatus comprising a gas storage holder having a movable bell, a gas main connected to the holder, a valve in the gas main and mechanism utilizing movement of said bell for actuating the valve and comprising a rotatable cam with a portion of constant radius that maintains the valve open while the bell moves within the lower part of its travel, a portion of variable radius that closes the valve as the bell rises through the intermediate part of its travel and a portion of constant radius that retains the valve closed while the holder moves within the upper part of its travel.

10. Apparatus comprising a gas storage holder comprising a movable bell, a gas main connected to the holder, a disc pivotally mounted in the gas main and mechanism utilizing movement of the bell for turning the disc to obstruct the flow of gas through the main and comprising a cam having a portion that maintains the disc edgewise to the flow of gas while the holder moves within the lower part of its travel, a portion that turns the disc on its pivotal mounting as the holder rises through the middle part of its travel and a portion that keeps the disc in obstructing position while the holder moves within the upper part of its travel.

11. Apparatus comprising a gas storage holder comprising a movable bell, a gas main connected to the holder, a valve in the gas main and mechanism utilizing movement of the bell for actuating the valve and comprising a rotatable cam with a portion of constant radius that permits the valve to remain open while the bell is within the lower part of its travel and a portion of variable radius that closes the valve as the bell rises through an intermediate part of its travel.

ROBERT S. DEANS.